(12) United States Patent
Aannestad (10) Patent No.: US 9,710,837 B1
(45) Date of Patent: Jul. 18, 2017

(54) SYSTEM AND METHOD ENABLING OWNERSHIP, TRADE, AND MARKETPLACE FOR NAMED GEOGRAPHIC LOCATIONS

(75) Inventor: Bjorn Aannestad, Austin, TX (US)

(73) Assignee: BSM TECHNOLOGIES LTD., Toronto, ON (CA)

(*) Notice: Subject to any disclaimer, the term of this patent is extended or adjusted under 35 U.S.C. 154(b) by 833 days.

(21) Appl. No.: 13/426,022

(22) Filed: Mar. 21, 2012

Related U.S. Application Data (60) Provisional application No. 61/466,369, filed on Mar. 22, 2011.

(51) Int. Cl.
*G06Q 30/06* (2012.01)
(52) U.S. Cl.
CPC .................. *G06Q 30/0619* (2013.01)
(58) Field of Classification Search
CPC .................................................. G06Q 30/0619
USPC ........................................................ 705/26.44
See application file for complete search history.

(56) References Cited

U.S. PATENT DOCUMENTS

| | | | | | |
|---|---|---|---|---|---|
| 6,018,714 | A | * | 1/2000 | Risen et al. ............... | 705/4 |
| 7,444,156 | B2 | * | 10/2008 | Boss ................. | H04W 4/02 |
| | | | | | 455/404.2 |
| 7,570,960 | B2 | * | 8/2009 | Fujii ................. | H04L 63/08 |
| | | | | | 340/539.13 |
| 8,264,345 | B2 | * | 9/2012 | Baron, Sr. ............ | G01W 1/00 |
| | | | | | 340/539.1 |
| 8,694,376 | B2 | * | 4/2014 | Bishop .............. | G06Q 30/02 |
| | | | | | 701/527 |
| 2002/0115446 | A1 | * | 8/2002 | Boss .................. | H04W 4/02 |
| | | | | | 455/456.6 |
| 2002/0173318 | A1 | * | 11/2002 | Dyer ............... | H04M 15/8033 |
| | | | | | 455/456.1 |
| 2003/0008672 | A1 | * | 1/2003 | Fujii ................ | H04L 63/08 |
| | | | | | 455/456.1 |
| 2003/0126250 | A1 | * | 7/2003 | Jhanji .................... | 709/223 |
| 2005/0023524 | A1 | | 2/2005 | Beatty | |
| 2007/0275730 | A1 | * | 11/2007 | Bienas ............ | H04M 15/8033 |
| | | | | | 455/456.1 |
| 2009/0077100 | A1 | * | 3/2009 | Hancock et al. ............... | 707/10 |
| 2009/0181640 | A1 | * | 7/2009 | Jones ..................... | 455/404.2 |
| 2010/0017218 | A1 | * | 1/2010 | Gazetova et al. ............... | 705/1 |
| 2010/0076829 | A1 | * | 3/2010 | Bishop .............. | G06Q 30/02 |
| | | | | | 705/14.15 |

(Continued)

*Primary Examiner* — Nicholas D Rosen
(74) *Attorney, Agent, or Firm* — Sean S. Wooden; Andrews Kurth Kenyon LLP (57) ABSTRACT

Embodiments for enabling ownership, trade, and marketplace for named geographic locations are provided. Embodiments provide a marketplace for ownership of named location-specifiers. Each named location-specifier corresponds to a latitude/longitude coordinate of a location. Embodiments provide an ownership registry for the named location-specifiers, provide a registry of named location-specifiers that retrieves data based on a user's request for location data related to the named location-specifiers, provide a location data store that stores current location data corresponding to the named location-specifiers, provide a future location data store that stores updated location data and future location data corresponding to the named location-specifiers, and provide a requesting system that allows the user to request location data corresponding to a named location-specifier or to conduct a search related to one or more of the named location-specifiers.

13 Claims, 5 Drawing Sheets

(56) References Cited

U.S. PATENT DOCUMENTS

| | | | |
|---|---|---|---|
| 2011/0022983 A1* | 1/2011 | Kim | G06F 3/0481 715/815 |
| 2011/0040691 A1* | 2/2011 | Martinez et al. | 705/80 |
| 2011/0128144 A1* | 6/2011 | Baron, Sr. | G01W 1/00 340/539.3 |
| 2011/0159884 A1* | 6/2011 | Chawla | 455/456.1 |

* cited by examiner

SYSTEM AND METHOD ENABLING
OWNERSHIP, TRADE, AND MARKETPLACE
FOR NAMED GEOGRAPHIC LOCATIONS

RELATED APPLICATION

This application claims priority to, and the benefit of, U.S. Provisional Application Ser. No. 61/466,369, filed on Mar. 22, 2011, entitled "SYSTEM AND METHOD ENABLING OWNERSHIP, TRADE, AND MARKETPLACE FOR NAMED GEOGRAPHIC LOCATIONS," which is herein incorporated by reference in its entirety.

TECHNICAL FIELD

The invention relates generally to systems and methods that allow individuals and legal entities to register their ownership of names, brand names, and personal identifiers when those identifiers are used for geographic location, position tracking and route-finding operations.

BACKGROUND

Location data, indicating the location of a vehicle, person, place or thing, is pervasive in today's world. The most commonly used location data includes street addresses (e.g., "123 Main Street, Anytown, Ga."). Other forms of location data include latitude/longitude pairs and various other coordinate systems. Addresses and coordinates can be collectively referred to as "location-specifiers."

Location-specifiers are used to send mail, travel to a destination, provide navigation instructions, track the movement of vehicles, persons or things, and for other related purposes. Software and hardware applications for entering, retrieving, and using location-specifiers exist today. For example, it is possible to use a paper map to find an address, and it is possible to enter an address or latitude/longitude coordinate into an electronic navigation device.

However, the existing location-specifiers have limitations. Street addresses are sometimes difficult to remember, and are subject to transcription errors. For example, the omission of an "N.," substitution with an "S.," or a dropped digit, can cause confusion and inaccuracy.

Although street addresses are commonly used by people to locate a place of business or to determine a place for people or resources to meet, they are not useful for businesses, organizations or people which move from place to place. Examples of such organizations or people include theater troupes, music bands, radio station contest vans, mobile food trucks and mobile resources like service technicians or salespeople.

Existing systems for retrieving ("looking up") the street address of a person or business involve delays and can be out-of-date. For example, a newly-opened restaurant will be first listed in a telephone directory many months after it is opened. Similarly, the updates of electronic directories ("point of interest databases") also involve delays before new information is available to those who use the information.

Furthermore, street addresses can be ambiguous due to inconsistent street naming and numbering changes over time as cities rename, rebuild, and adjust their road networks. Additionally, street addresses are limited in their coverage. For example, locations away from towns and cities may not have addresses. Further, street addresses are limited in accuracy. While the street address of a large stadium or park may be well-known, that address is not useful for identifying specific locations within a multi-acre area. Latitude/longitude coordinates and other coordinate systems also have limitations. For example, latitude/longitude coordinates, while being precise, are numeric: (37.112932, −108.292911) and therefore difficult for people to remember and are subject to significant transcription errors.

SUMMARY

An embodiment of a method enables ownership, trade, and marketplace for named geographic locations. The method includes providing a marketplace for ownership of named location-specifiers. Each named location-specifier corresponds to a latitude/longitude coordinate of a location. The method further includes providing an ownership registry for the named location-specifiers, providing a registry of named location-specifiers that retrieves data based on a user's request for location data related to the named location-specifiers, providing a location data store that stores current location data corresponding to the named location-specifiers, providing a future location data store that stores updated location data and future location data corresponding to the named location-specifiers, and providing a requesting system that allows the user to request location data corresponding to a named location-specifier or to conduct a search related to one or more of the named location-specifiers.

An embodiment of a system enables ownership, trade, and marketplace for named geographic locations. The system includes an ownership registry that allows owners of named location-specifiers to register the named location-specifiers. Each named location-specifier corresponds to a latitude/longitude coordinate of a location. The system further includes a registry of named location-specifiers that retrieves data based on a user's request for location data related to the named location-specifiers, a location data store that stores current location data corresponding to the named location-specifiers, a future location data store that stores updated location data and future location data corresponding to the named location-specifiers, and a requesting system that allows the user to request location data corresponding to a named location-specifier or to conduct a search related to one or more of the named location-specifiers.

An embodiment of a non-transitory computer readable medium provides instructions for enabling ownership, trade, and marketplace for named geographic locations. The instructions include providing a marketplace for ownership of named location-specifiers. Each named location-specifier corresponds to a latitude/longitude coordinate of a location. The instructions further include providing an ownership registry for the named location-specifiers, providing a registry of named location-specifiers that retrieves data based on a user's request for location data related to the named location-specifiers, providing a location data store that stores current location data corresponding to the named location-specifiers, providing a future location data store that stores updated location data and future location data corresponding to the named location-specifiers, and providing a requesting system that allows the user to request location data corresponding to a named location-specifier or to conduct a search related to one or more of the named location-specifiers.

DESCRIPTION OF THE DRAWINGS

The detailed description will refer to the following drawings, wherein like numerals refer to like elements, and wherein.

DETAILED DESCRIPTION

Described herein are embodiments of a system and method for enabling ownership, trade, and marketplace for named geographic locations. As noted above, location data (also referred to as "location-specifiers") indicates the location of a vehicle, person, place or thing and can include street addresses, latitude/longitude pairs, and various other coordinate systems.

Embodiments include methods and computerized systems, including processors and memories that allow individuals or other entities to create a textual or symbolic identifier (also referred to as the "named location-specifier"). The named location-specifier may be at least one character or symbol in length and unique among the named location-identifiers already registered. Embodiments allow individuals or other entities to register their ownership of a named location-specifier in a manner similar to the registration of a trademark, business name, or internet domain name. Examples of the named location-specifier include "MikesBarAndGrill," "CarnegieHall," or "BenJohnson." Embodiments allow individuals or entities to register memorable, personalized, and/or branded named location-specifiers. The name may correspond to the commonly used name of the owner. For example, to get driving directions to the Austin Civic Center, a user need only enter the named location-specifier "Austin Civic Center." Embodiments allow multi-level names that may be readily understood as "named location-identifiers" by the inclusion of a key phrase or symbol. For example, "Ikea.geo" or "Ikea.loc" may be registered under the single registered named location-specifier "Ikea." Embodiments allow the naming of specific devices within a given broad named location identifier, such as "Truck1202.UnitedFreightLines," "Truck1203.UnitedFreightLines," "Truck1204.UnitedFreightLines," etc.

For businesses, the named location-specifiers may be branded tags that the businesses own, representing static or moving locations the businesses want to share with customers. For example, embodiments may return the latitude/longitude coordinates in response to a request for "DaveMatthewsBand" and allow the latitude/longitude coordinates to change as the band plays in different locations on different dates. Likewise, an advertisement may show "Come to the grand opening of our new store at ikeaaustin.geo!" and the input of "ikeaaustin.geo" into the PND will take a customer to the location. Similarly, a sushi restaurant owner in Boston may advertise "bestbostonshushi.geo," which is recognized by a navigation device or cell phone of a customer to guide him or her to the restaurant. A user may type in a question on a PND, such as "who's playing near her tonight?" and the PND may provide the current information based on a search of relevant named location-specifiers. Similarly, an owner of a band can schedule locations for future dates, e.g., "Come see Broadway's 'Wickes'" in San Antonio." A user may use "wickes.geo" to find the location of the band on the advertised date.

For individuals, the named location-specifiers may be personalized names used to share static or moving "where I am" information with anyone the individual wants, only when the individual wants, and under the individual's control. For example, an individual can give directions to a house party by putting "bobandmaryjones.geo" on the invitation. A guest may type "bobandmaryjones.geo" into a personal navigation device (PND) to find the individual's house.

In embodiments, the registry of named location-specifiers may be managed similar to Internet domain names by charging a registration fee, and allowing an open market for buying and selling. A server may store incoming named location-specifiers from mobile devices, and securely distribute current named location-specifiers on request by a navigation device or navigation application. The server may provide a website for registrants to manage their permissions and to schedule location updates. The server may provide a requesting system/application for users to update and share/publish locations, to find someone by named location-specifiers, and to find nearby businesses that has the relevant named location-specifiers. The named location-specifiers may be typed directly into a user's navigation device and/or navigation application.

Embodiments record the coordinates that correspond, at a given point in time, to a named location-specifier. Embodiments record the owner's name, contact information, and identifying information (passwords) in order to preserve and later verify the ownership, or "title" to the "property" embodied in the named location-specifier. Embodiments support the trading, buying and selling of registered named location-specifiers to create a market.

A company that owns the registry of named location-specifiers may collect revenue from annual registrations of the named location-specifiers, similar to domain names. A company may collect license revenue from partners that look up the named location-specifiers registered in the company's name. A company may also collect advertising revenue from people that want to deliver location-based or date-based advertisements. Businesses may obtain combined named location-specifier feeds from multiple mobile vendors even though there is no partnership between the vendors. The named location-specifiers represent a unification of the feed back to the business.

Embodiments may also benefit social networking by allowing friends to follow an individual to a specific location, such as a bar, a festival, or a vacation spot. The individual can control who can see his or her location by date or time, by level of accuracy, in groups (such as immediate family, friends, business colleagues), on/off times, immediate updates, or by a specific period of time (such as the next 10 minutes only).

Embodiments prevent other individuals or entities from registering an identical identifier. Embodiments allow owners to cancel or renew their ownership and allow owners to transfer ownership to another individual or entity, which may or may not include financial or other compensation in return for the sale. Embodiments allow the owner of the named location-specifier to set, change, and update the corresponding latitude/longitude coordinates at any time they choose, for the current moment in time, or in anticipation of their position at future times.

Embodiments allow an owner to specify the latitude/longitude coordinates or street address, which the owner states as corresponding to a static named location-identifier. For example, the location-specifier "CandlestickPark" is declared by its owner to correspond to the latitude 37.71642, and longitude −122.38555.

Embodiments allow an owner to specify the latitude/longitude coordinates or street address, which the owner states as corresponding to a dynamic named location-identifier. For example, the location-specifier "DaveMatthewsBand" may be configured to change to daily according to the location of the different venues where the band performs on each date.

Embodiments allow an owner to specify the latitude/longitude coordinates or street address, which the owner states as corresponding to a dynamic and actively moving named location-identifier. In other words, embodiments allow immediate updates of the location as it changes, through the use of an automated lookup request/response system, with no intervening paper or database publication required. For example, the coordinates corresponding to a named location-specifier, e.g., "BenJohnson," may be configured to change based on GPS results reported by a cell phone, computer, or other device that the owner, e.g., Ben Johnson, carries with him. In this embodiment, the system supports automated location updates from remote devices, communicated over electronic networks; and allow an owner to learn the locations from which requests are being made. The remote devices may include portable GPS devices, such as handheld GPS systems, in-vehicle navigation and tracking devices, computers, and cellular phones.

Embodiments allow a different individual or system (also referred to as "user") to retrieve the latitude/longitude coordinates corresponding to the current or future location of a named location-specifier, for the purposes of, for example, receiving system-generated driving directions to that location. Embodiments facilitate finding the location of an entity named by the named location-specifier. Embodiments provide devices and software that perform functions dependent on the past, current, and future locations of named location-specifiers.

Embodiments provide software for computers, cell phones, and other electronic devices that produces a map representation of the corresponding location based on the lookup of the named location-specifier, and that produces continually-updated driving or traveling directions to the corresponding location, which may or may not change during the time period in which the directions are being use. An embodiment of this function would be a "hyperlink" analogous to the existing "http:" and "mailto:" specifiers available to Internet web-enabled devices. For example, "goto: {named location-specifier}."

Embodiments may provide responses to requests for the coordinates that correspond, at a given point in time, to a named location-specifier. Embodiments may reply to a request for location with one or more results, such as Currently at (lat, lon), Next at (lat, lon) on (date, time), Private, No Known Location, and other results as appropriate. Embodiments allow the owner of a named location-specifier to specify that the registry should return a "no location" or "private" result instead of coordinates or a street address, for times, dates, and circumstances when the location is meaningless or should be kept private.

Embodiments allow navigation devices to request the coordinates for the named location-specifiers that have been entered by users. Embodiments may publish the current coordinates for the named location-specifiers that have been entered by the users of navigation devices. Embodiments return a list of name location-specifiers, based on proximity, category, business type, or other search criteria. Embodiments allow an individual or entity to request permission, from the owner, to access the location data of a named location-specifier. Embodiments allow an owner to specify, approve or deny access to the location data based on the identity or identifying information of the requesting system or individual. Embodiments allow the owner of a named location-specifier to grant or limit access to the location data by individual, by time, by general location, or by date. Embodiments allow the owner of multiple remote devices to access their current and past location data via a single electronic service, regardless of the manufacturers or types of the devices themselves. Embodiments allow the owner of a named location-specifier to learn the identities of the systems or individuals making requests for location data.

In a method according to embodiments described herein, the method assigns a named location-specifier to a person or other entity. The assigned named location-specifier may include a mechanism through which the entity may temporarily register the named location-specifier to a given device from which the entity's location may be determined. In this manner, the location of the entity may be linked to the named location-specifier and constantly updated as the entity changes location. The method, therefore, may register the named location-specifier to, e.g., a mobile phone, GPS device, vehicle, computer, tablet, etc, that the entity will be carrying. As the entity moves around, the location of the mobile phone and, ergo, the entity, will be determined and updated and linked to the named location-specifier. The method determines the entity location and links that location to the named location-specifier. The entity may limit the availability of the named location-specifier, and hence, the entity's location. The method, therefore, may include making available the named location-specifier and its location and limiting the availability of the named location-specifier and its location. For example, the named location-specifier and its location may be completely available or limited to providing different levels of detail to different levels of access. For example, certain levels of access may be permitted to see the exact location of the named location-specifier, and hence the associated entity, while others may only be permitted to see that the named location-specifier, and hence the associated entity, are in a given city, area or region. The method may include tracking the movement of the named location-specifier and storing tracked movement for later analysis. The method may include analyzing the location and movement of the named location-specifier to determine specific places visited (e.g., POIs) by the associated entity. These and other method steps are apparent from the above description. Likewise, a computer system, including a processor and memory for performing these steps and others may be provided. The computer system may include a computer readable medium with instructions, which may be executed by a processor to perform these steps and others, stored thereon.

Figure 1:
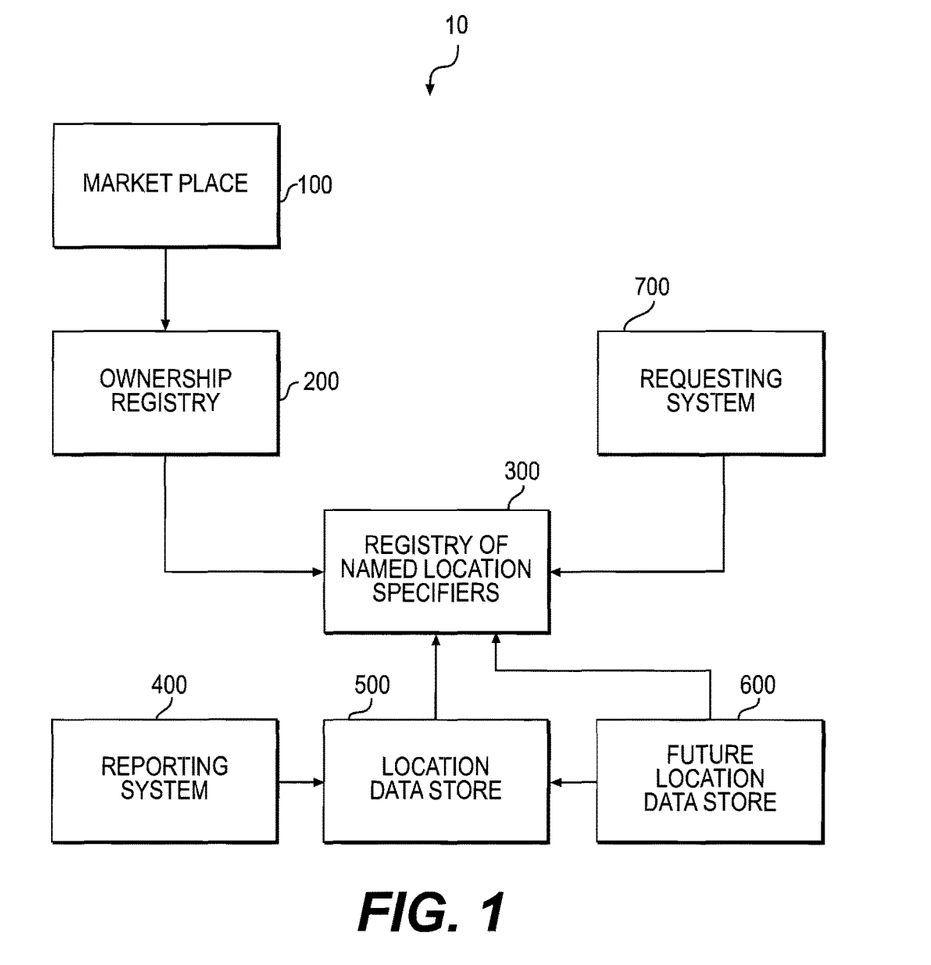
FIG. 1 illustrates an embodiment of an exemplary system for enabling ownership, trade, and marketplace for named geographic locations.

FIG. 1 illustrates an embodiment of an exemplary system 10 for enabling ownership, trade, and marketplace for named geographic locations. Marketplace 100 buys, sells, or transfers ownership of named location-specifiers, and determines values of the named-location-specifiers. A person or corporate entity can purchase the legal ownership rights to one or more named geographic identifiers. The "ownership" confers the right to control the reported location, access permissions, visibility and terms of the identifier and any sub-ordinate location identifiers. The legal owner of a named geographic identifier can sell or transfer legal ownership to another entity, analogous to the sale or transfer of title to a corporate brand name. A free-market value is established for identifiers with particular characteristics, either by auction, appraisal, sales price or other market-driven means of establishing the value of equivalent properties. Ownership registry 200 registers or creates named location-specifiers, record owner's information, processes renewal and cancellation of the registered named location-specifiers. The process of registration establishes the existence and ownership of a named geographic entity, by registering such property and ownership credentials with an official registrar. An official registrar is an entity charged with recording, publishing, and adjudicating ownership of the identifiers in return for registration fees. The registrar is charged with preserving the ownership records and providing a process whereby owners may establish ownership for a limited term. Upon nearing the end of the term, the registrar will attempt to contact the owner-of-record, and offer to renew the ownership in return for a renewal fee. Similarly, the owner-of-record may elect to initiate the renewal process. Alternatively, the owner-of-record may elect to end the ownership term, thereby making the named geographic identifier available for registration by another entity. Registry of named location-specifiers 300 verifies a requesting user's authorization to access the named location-specifiers, retrieves data based on the user's request, and record an audit log of the user's requests as well as all of the requestors. Reporting system 400 submits updated locations and confirms or denies access permissions. Location data store 500 provides current location data and records location histories. Future location data store 600 submits updated location data and provides future location data. Requesting system 700 requests location data, requests subscription to periodic updates, conducts searches, and requests permission to access data. The registry of named location-specifiers 300 and the requesting system 700 will be described in more detail with respect to FIGS. 2 and 3, respectively.

Figure 2:
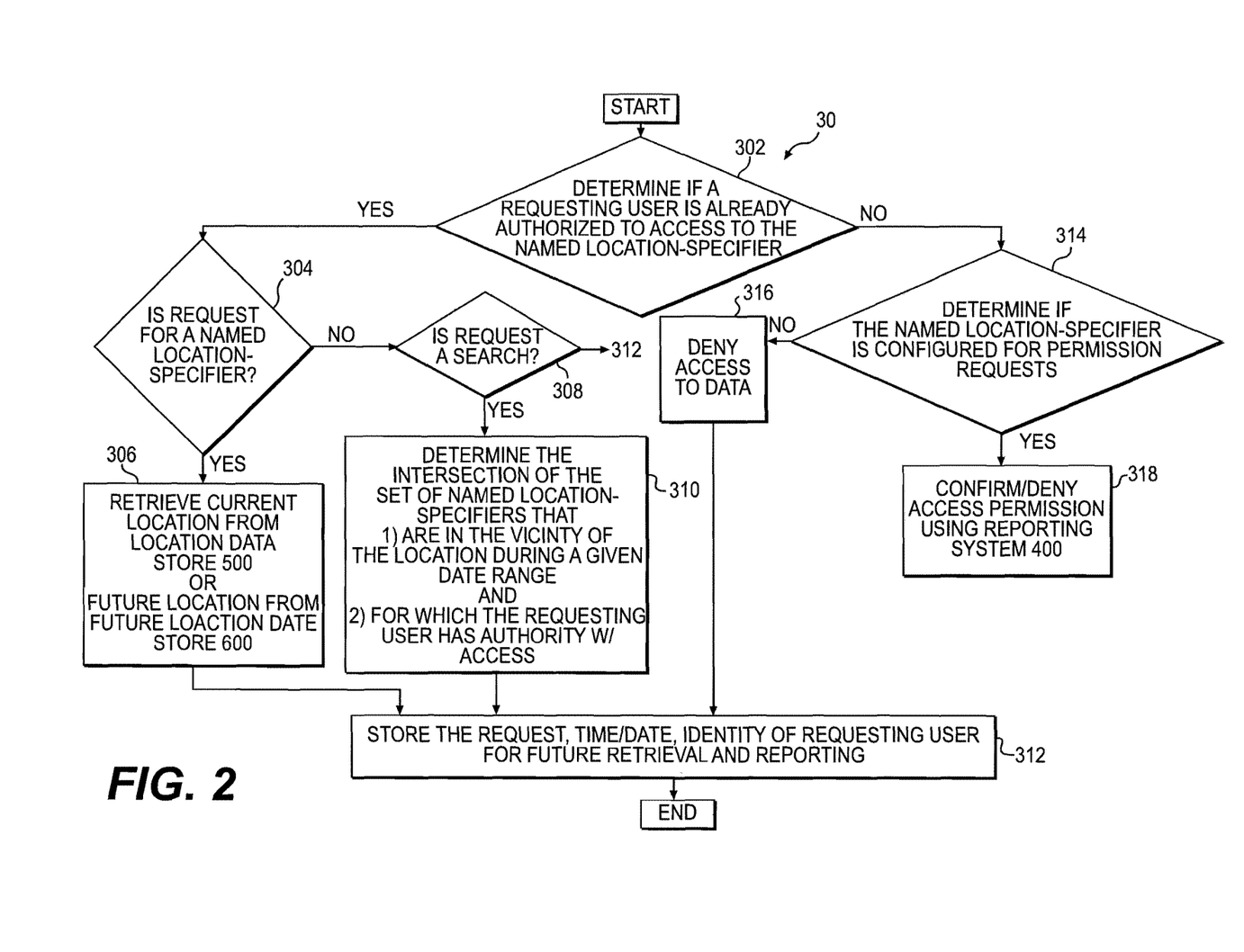
FIG. 2 is a flow chart illustrating an embodiment of a process performed by the registry of named location-specifiers of FIG. 1.

FIG. 2 is a flow chart illustrating an embodiment of a process 30 performed by the registry of named location-specifiers 300 of FIG. 1. The registry of named location-specifiers 300 verifies a requesting user's authorization by determining if a user requesting a specific named location-specifier is already authorized for access to the named location-specifier (block 302). This process may vary by the degree of authentication required by the owner and/or the registrar, and may involve one or more of the following forms of authentication: username/password, access key encryption, verification of unique device identifiers, public/private key encryption, embedded hardware signing, secure transmission protocols, and call-back verification. If yes, process 30 determines if the request is for a named location-specifier (block 304). If yes, process 30 retrieves current location data from location data store 500 and/or retrieves future location data from future location data store 600 (block, 306). Then process 30 stores the request, the time/date of the request, and identity of the requesting user for future retrieval and reporting (block 312). This record of past locations may be referred to as the "Location History", and represents a "trail" of which can be used for verification purposes, analytical processing of time and distance data, and for projecting future locations. The preserved Location History may also be returned to a requesting system 700.

If the request is not for a named location-specifier (block 304), process 30 determines if the request is a search (block 308). If yes, process 30 determines the intersection of the set of named location-specifiers that are in the vicinity of the location during a given date range, and for which the requesting user has authority to access (block 310). Process 30 then goes to block 312. If the request is not a search (block 308), process 30 goes to block 312.

If the requesting user is not already authorized for access (block 302), process 30 determines if the named location-specifier is configured for permission requests (block 314). If yes, process 30 confirms or denies access permission using the reporting system 400 (block 318). If the named location-specifier is not configured for permission requests (block 314), process 30 denies access to the data (block 316), and goes to block 312.

Figure 3A:
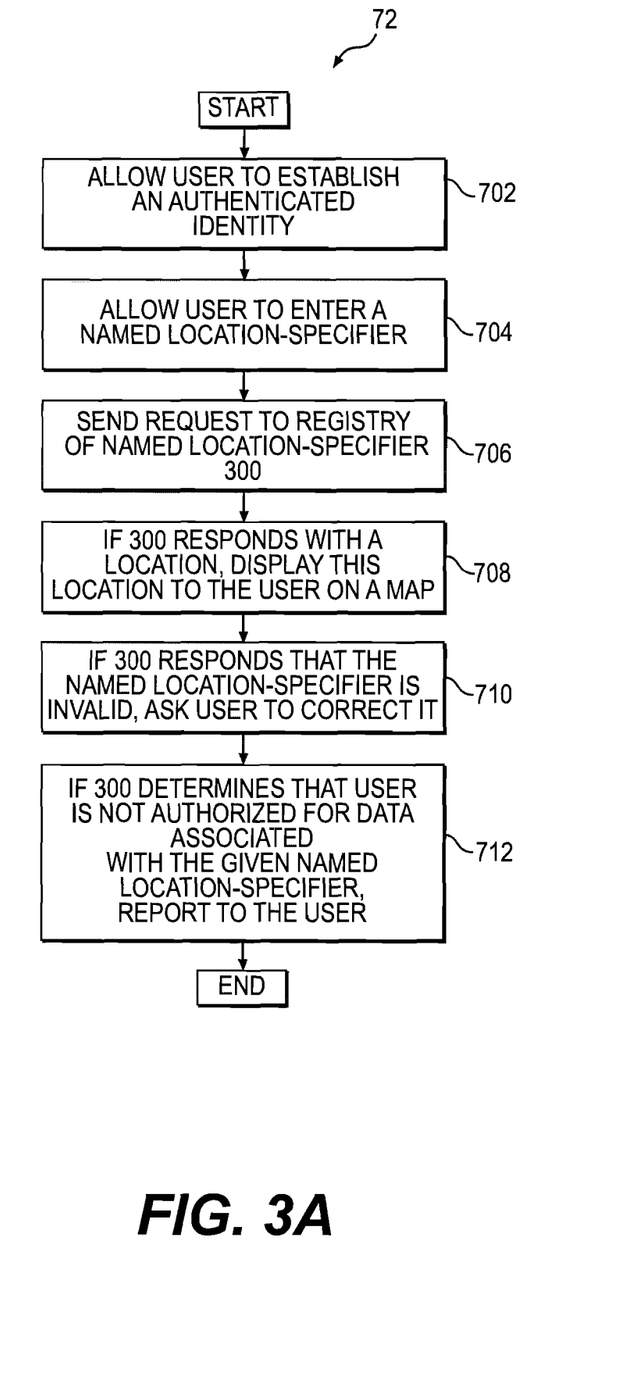
FIG. 3A is a flow chart illustrating an embodiment of a process performed by the requesting system of FIG. 1 to request location data.

FIG. 3A is a flow chart illustrating an embodiment of process 72 performed by the requesting system 700 of FIG. 1 to request location data. Process 72 allows a user to establish an authenticated identity (block 702), allows the user to enter a named location-specifier (block 704), and sends the request to the registry of named location-specifier 300 (block 706). If the registry of named location-specifier 300 responds with a location, process 72 displays this location to the user on a map, for example (block 708). If the registry of named location-specifier 300 responds that the named location-specifier is invalid, process 72 asks the user to correct the named location-specifier (block 710). If the registry of named location-specifier 300 determines that the user is not authorized for data associated with the given named location-specifier, process 72 reports the finding to the user (block 712).

Figure 3B:
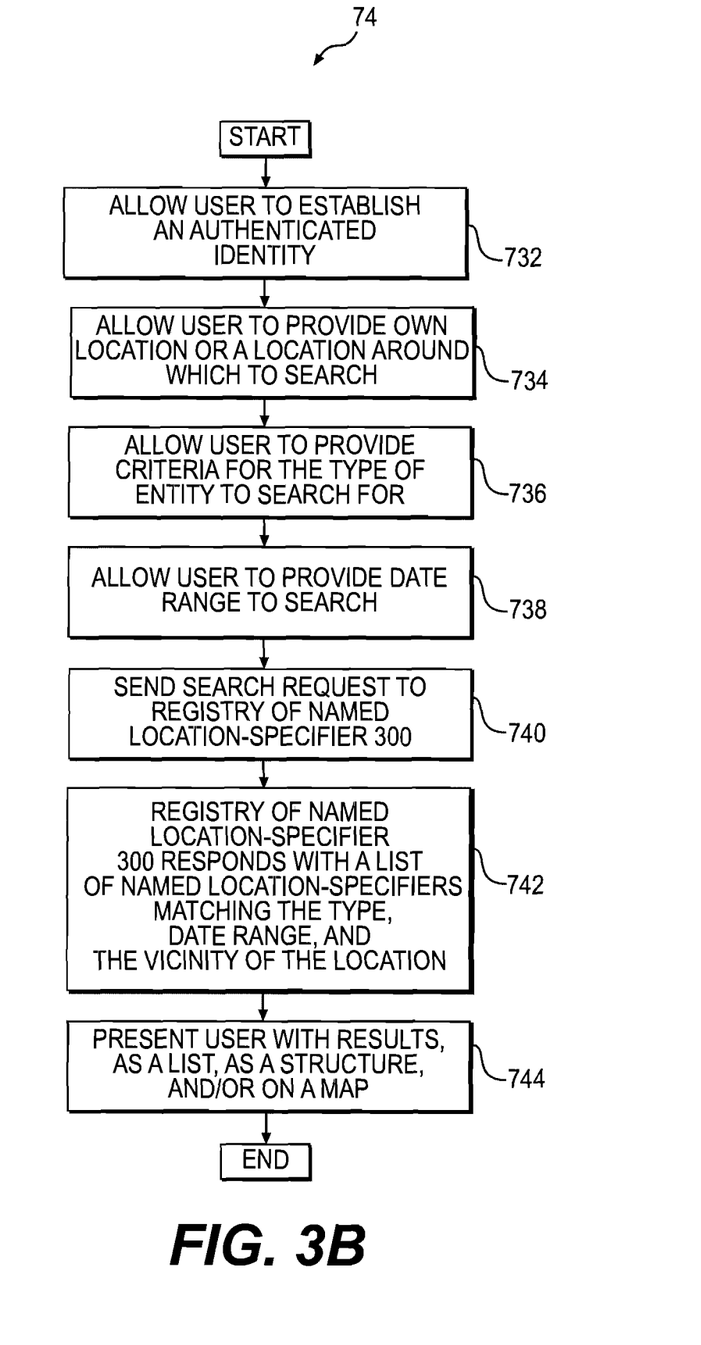
FIG. 3B is a flow chart illustrating an embodiment of a process performed by the requesting system of FIG. 1 to conduct a search.

FIG. 3B is a flow chart illustrating an embodiment of process 74 performed by the requesting system 700 of FIG. 1 to conduct a search. Process 74 allows a user to establish an authenticated identity (block 732), allows the user to provide his of her own location or a location around which to search (block 734), allows the user to provide criteria for the type of entity to search for (block 736), and allows the user to provide a date range to search (block 738). Process 74 sends the search request to the registry of named location-specifier 300 (block 740). If the registry of named location-specifier 300 responds with a list of named location-specifiers matching the type, date range, and the vicinity of the location (block 742), process 74 presents user with the results in various forms, such as in a list, as a structure, and/or on a map (block 744).

Figure 4:
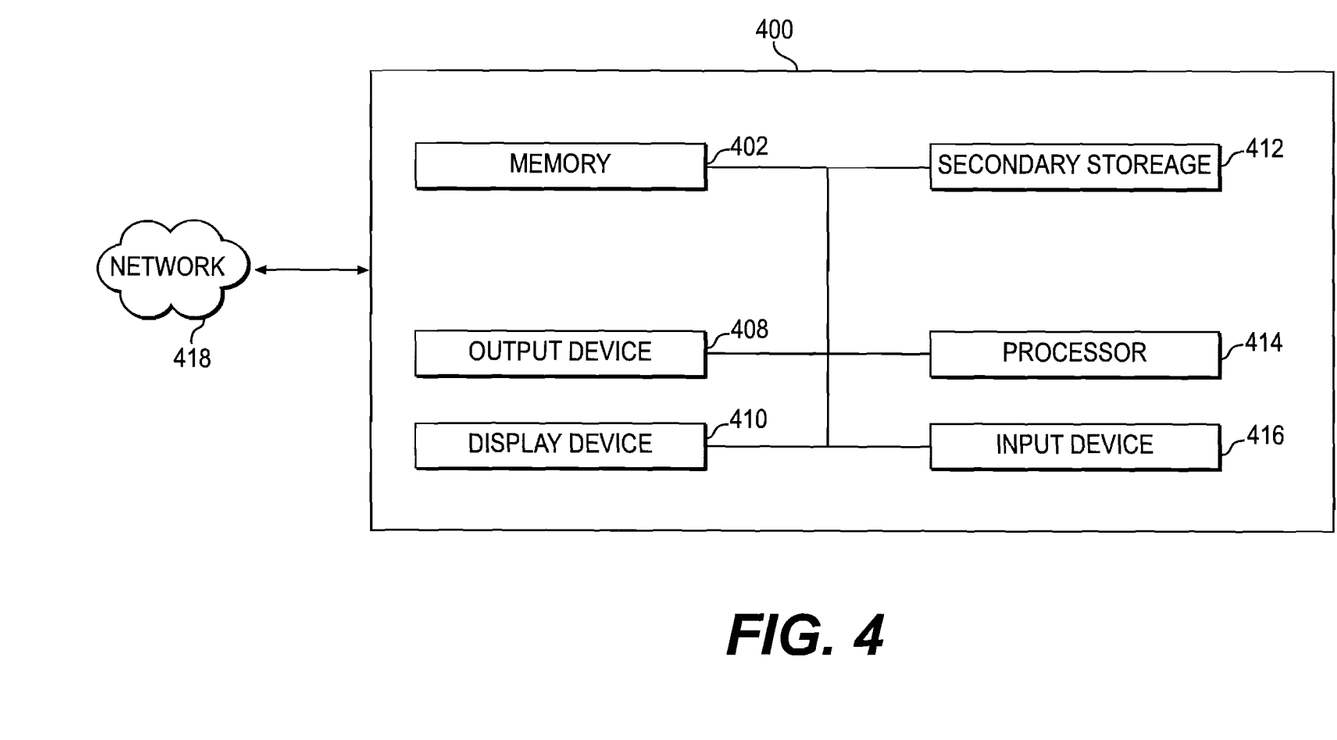
FIG. 4 illustrates exemplary hardware components of a computer that may be used in connection with an embodiment of a method and system for enabling ownership, trade, and marketplace for named geographic locations.

With reference now to FIG. 4, shown is a block diagram illustrating exemplary hardware components for implementing embodiments of the system and method for enabling ownership, trade, and marketplace for named geographic locations. Server 400, or other computer system similarly configured, may include and execute one or more programs to perform functions described herein, including steps of the method described above. Likewise, a mobile device which includes some of the same components of computer system 400 may perform steps of the method described above. Computer system 400 may connect with network 418, e.g., Internet, or other network, to receive inquires, obtain data, and transmit information and incentives as described above.

Computer system 400 typically includes a memory 402, a secondary storage device 412, and a processor 414. Server 400 may also include a plurality of processors 414 and be configured as a plurality of, e.g., bladed servers, or other known server configurations. Server 400 may also include an input device 416, a display device 410, and an output device 408. Memory 402 may include RAM or similar types of memory, and it may store one or more applications for execution by processor 414. Secondary storage device 412 may include a hard disk drive, floppy disk drive, CD-ROM drive, or other types of non-volatile data storage. Processor 414 executes the application(s), which are stored in memory 402 or secondary storage 412, or received from the Internet or other network 418. The processing by processor 414 may be implemented in software, such as software modules, for execution by computers or other machines. These applications preferably include instructions executable to perform the functions, processes and methods described above and illustrated in the Figures herein. The applications preferably provide GUIs through which users may view and interact with the application(s).

Also, as noted, processor 414 may execute one or more software applications in order to provide the functions described in this specification, specifically to execute and perform the steps and functions in the methods described above. Such methods and the processing may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the system for enabling ownership, trade, and marketplace for named geographic locations.

Input device 416 may include any device for entering information into computer system 400, such as a touchscreen, keyboard, mouse, cursor-control device, microphone, digital camera, video recorder or camcorder. The input device 416 may be used to enter information into GUIs during performance of the methods described above. Display device 410 may include any type of device for presenting visual information such as, for example, a computer monitor or flat-screen display (or mobile device screen). The display device 410 may display the GUIs and/or output from the application(s). Output device 408 may include any type of device for presenting a hard copy of information, such as a printer, and other types of output devices include speakers or any device for providing information in audio form.

Examples of computer system 400 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 400 is shown in detail, embodiments of the system for enabling ownership, trade, and marketplace for named geographic locations may use multiple computer systems or servers as necessary or desired to support the users and may also use back-up or redundant servers to prevent network downtime in the event of a failure of a particular server. In addition, although computer system 400 is depicted with various components, one skilled in the art will appreciate that computer system 400 can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling a computer system, such as computer system 400, to perform a particular method, such as methods described above.

The terms and descriptions used herein are set forth by way of illustration only and are not meant as limitations. Those skilled in the art will recognize that many variations are possible within the spirit and scope of the invention, and their equivalents, in which all terms are to be understood in their broadest possible sense unless otherwise indicated.

What is claimed is:

1. A system for enabling ownership, trade, and marketplace for named geographic locations, comprising:
    a plurality of portable global positioning system (GPS) devices, wherein said GPS devices each correspond to a named location-specifier, wherein the data of each GPS device are selectively shared by an owner of the corresponding named location-specifier;
    a computer including a processor and a memory, wherein the processor is programmed to execute instructions stored in the memory, and the instructions executed include:
        use an ownership registry to allow owners of named location-specifiers to register the named location-specifiers, wherein each named location-specifier corresponds to a latitude and longitude coordinate of a location;
        use a registry of named location-specifiers to retrieve current or future location data based on a user's request for location data related to the named location-specifiers;
        use a location data store to store current location data corresponding to the named location-specifiers;
        use a future location data store to store future location data corresponding to the named location-specifiers;
        use a location history record to store past locations of the named location-specifiers with their corresponding latitude and longitude coordinates, wherein location history is used for projecting future locations of the named location-specifiers with their future corresponding latitude and longitude coordinates;
        receive updates of location data from one or more of the plurality of portable global positioning system (GPS) devices, the updates of location data being obtained by use of a global positioning system at said one or more portable global positioning system (GPS) devices, and automatically sent by said one or more portable global positioning system (GPS) devices to said computer;
        use a reporting system to automatically update latitude and longitude coordinates associated with a named location-specifier using portable global positioning system (GPS) devices wherein the reporting system allows the owner of a named location-specifier to select the level of accuracy of location data reported, and wherein the automatic updating of latitude and longitude coordinates is performed using said updates of the location data received from the one or more using portable global positioning system (GPS) devices;
        use a requesting system to allow the user to request location data corresponding to a named location-specifier or to conduct a search related to one or more of the named location-specifiers; and
        use a display system to display the projected future locations of the named location-specifiers with their future corresponding latitude and longitude coordinates in response to the user request.

2. The system of claim 1, wherein the registry of named location-specifiers further verifies authorization of the user requesting data related to the registered named location-specifier, and records an audit log of the user's request and the requesting user.

3. The system of claim 1, wherein the ownership registry allows buying, selling and transferring of ownership of named location-specifiers.

4. The system of claim 1, wherein the requesting system allows the user to request subscription to periodic updates of the corresponding latitude and longitude coordinates of the named location-specifiers.

5. The system of claim 1, wherein the location data store provides current location data corresponding to a named location-specifier and records location history associated with the named location-specifier.

6. The system of claim 1, wherein the future location data store provides updated location data and future location data corresponding to a named location-specifier.

7. The system of claim 1, wherein the ownership registry determines values of the named location-specifiers.

8. The system of claim 1, wherein the ownership registry records information of an owner of a named location-specifier.

9. The system of claim 1, wherein the ownership registry allows an owner of a named location-specifier to renew or cancel the registration.

10. The system of claim 1, wherein the registry of named location-specifiers allows an owner of a named location-specifier to set, change, and update the corresponding latitude and longitude coordinates at any time.

11. The system of claim 1, wherein the GPS devices include one or more of a handheld GPS system, an in-vehicle navigation and tracking device, a computer, and a cellular telephone.

12. The system of claim 1, wherein an owner of a named location-specifier can grant or limit access to the location data by individual, by time, by general location, or by date.

13. The system of claim 1, wherein the registry of named location-specifiers:

determines if a user requesting location data associated with a named location-specifier is authorized for access to the named location-specifier, and retrieves current location data from the location data store and retrieves future location data from the future location data store if the user has authorization.

* * * * *